Patented Feb. 13, 1945

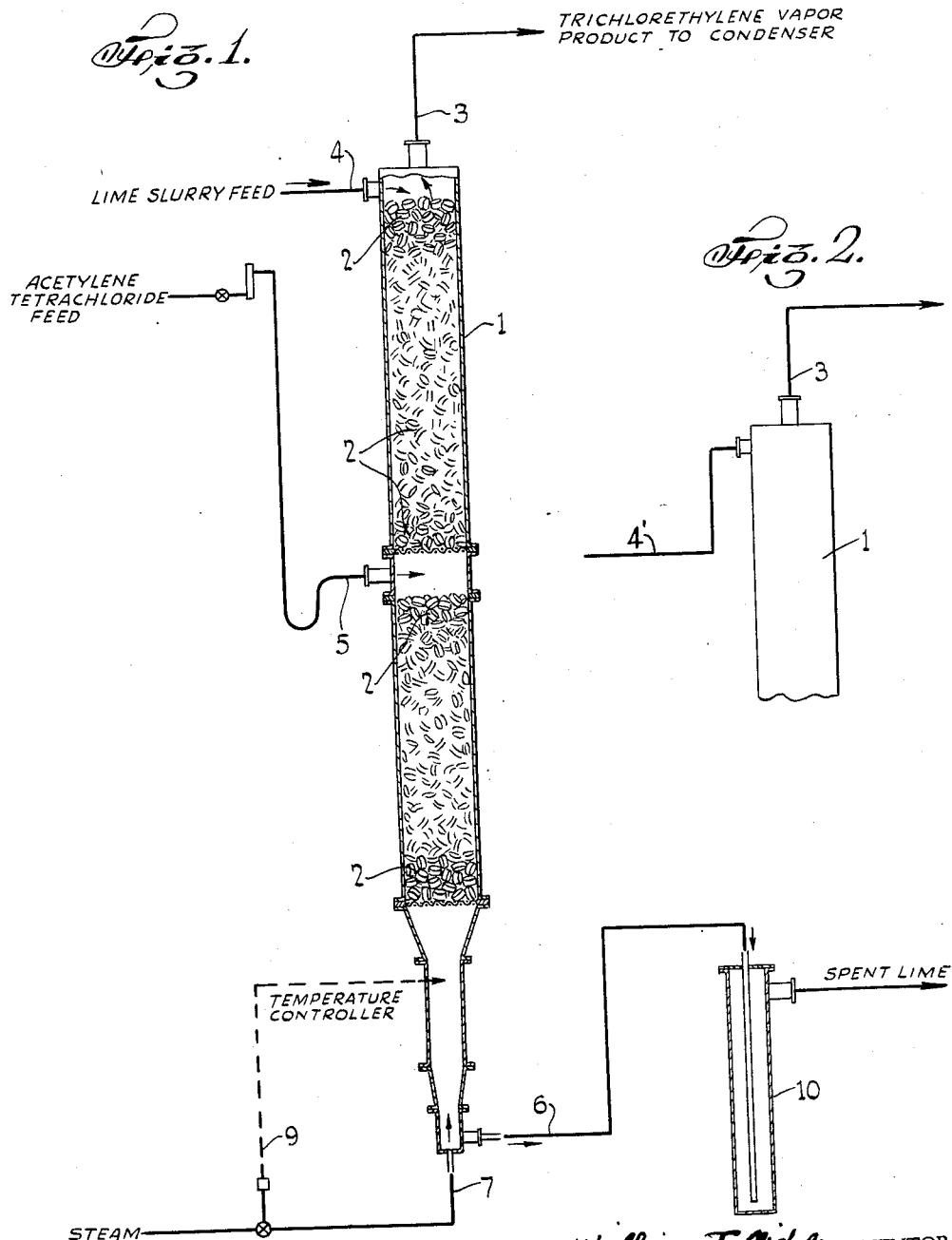

2,369,485

UNITED STATES PATENT OFFICE 2,369,485

PROCESS FOR PRODUCING UNSATURATED CHLORINATED HYDROCARBONS

William T. Nichols, St. Albans, W. Va., assignor to Westvaco Chlorine Products Corporation, New York, N. Y., a corporation of Delaware Application July 28, 1942, Serial No. 452,604

12 Claims. (Cl. 260—654)

This invention relates to a continuous process for producing unsaturated chlorinated hydrocarbons including trichlorethylene. Particularly, it is concerned with a continuous process for making trichlorethylene from acetylene tetrachloride by reaction with a basic compound of a metal selected from the group of alkali metals and alkali-earth metals.

A common commercial method for making trichlorethylene consists of treating acetylene tetrachloride with an aqueous solution or suspension of lime in a batch process. This method is described in German Patent 171,900 (1905). In addition to lime, other alkaline reagents, including sodium hydroxide and carbonate, alkali-earth metal compounds, and ammonia, have been suggested for effecting the dehydrochlorination of acetylene tetrachloride to form trichlorethylene. In some cases a mixture of basic compounds with alkali-earth metal hydroxides has been used. However, the use of the alkali-earth metal hydroxides alone and particularly lime is advantageous because the reaction is readily controllable and does not tend to produce undesirable reaction products, such as in the case of the use of strong alkali-metal hydroxides.

As stated above, these methods have been applied as a batch-type operation in which acetylene tetrachloride and the basic compound in aqueous solution were brought together and stirred for a period of time sufficient to convert all the acetylene tetrachloride to trichlorethylene. The reactants separated into two layers. The trichlorethylene was removed from the aqueous layer and was then purified by distillation. Similar methods have been used for the preparation of other unsaturated chlorinated hydrocarbons. Due to the number of operations, this process is expensive, involving high labor costs and considerable equipment.

Among the objects of my invention is the provision of a continuous process for the production of unsaturated chlorinated hydrocarbons from saturated chlorinated hydrocarbons that are dehydrochlorinatable by reaction of the saturated compound with a basic solution in a column wherein separation of the reaction products from the unreacted products can be effected continuously by rectification.

Another object is a continuous process for producing trichlorethylene cheaply and of high purity from acetylene tetrachloride.

Still another object is a convenient commercial method of producing perchlorethylene from pentachlorethane and s-dichlorethylene from 1,1,2-trichlorethane.

Various other objects and advantages of my invention will appear in the detailed description thereof, which follows.

I have discovered that acetylene tetrachloride or other saturated chlorinated hydrocarbons which are dehydrochlorinatable may be continuously converted to trichlorethylene or other unsaturated chlorinated hydrocarbons by continuously bringing acetylene tetrachloride or other saturated chlorinated hydrocarbons which are dehydrochlorinatable into contact with a basic compound, preferably either in aqueous solution or suspension, in a column in which the reaction products may be continuously separated from the reactants.

For the production of trichlorethylene, the process comprises introducing a basic compound, usually lime, at the upper portion of the column, allowing it to pass down the column, passing acetylene tetrachloride in contact with the basic solution for a period of time sufficient to effect the dehydrochlorination of the acetylene tetrachloride quantitatively, withdrawing the resulting solution in the form of a chloride of the base used from the bottom of the column, and continuously collecting trichlorethylene from the upper portion of the column. Acetylene tetrachloride is introduced in to the column at some intermediate point, either as a liquid or in the vapor phase.

The portion of the column above the point of introduction of acetylene tetrachloride is maintained at a temperature above the boiling point of trichlorethylene in water (73° C.) but below the boiling point of the acetylene tetrachloride in water (94° C.). In other words, the temperature of the upper portion of the column is regulated to strip acetylene tetrachloride from trichlorethylene. Under these conditions, a substantially pure product may be withdrawn from the top of the column. The column below the point of introduction of acetylene tetrachloride is maintained at a temperature above the boiling point of acetylene tetrachloride in water (94° C.) but below the boiling point of the spent basic solution. In most cases this will be a temperature of the order of 100–105° C. The purpose of this is to prevent loss of acetylene tetrachloride with the outflowing basic solution.

It should be noted that pure trichlorethylene boils at 87° C., but in the presence of water a constant-boiling mixture having a boiling point lower than either that of trichlorethylene or water is formed. This constant-boiling mixture boils at about 73° C. Likewise, pure acetylene tetrachloride boils at 146° C., but forms a constant-boiling composition with water, boiling at about 94° C. All of the chlorinated hydrocarbons that are immiscible with water form similar constant-boiling compositons.

The lower portion of the column may be heated to the proper temperature to vaporize all unreacted acetylene tetrachloride in a number of ways. A convenient method is to introduce steam internally in the column and thereby heat the effluent basic solution to the desired temperature. To maintain stripping conditions in the upper portion of the column the rate of flow of the incoming basic solution is regulated to cool this portion of the column to a temperature low enough to effect the desired separation of the trichlorethylene from acetylene tetrachloride.

I prefer to conduct the process in a column known as the "packed type," although with proper design a plate or bubble column may be used. Any desired contact medium may be used in the column, but I have found that an open type, such as Raschig rings, is suitable.

Generally, calcium hydroxide is a satisfactory alkaline reagent and it is used in aqueous solution or suspension. Ordinarily, I prefer to use it in a range of concentration from about 2.5 to 20 per cent by weight. Calcium hydroxide has only a limited solubility in water and the major portion of the material is in suspension rather than true solution, sometimes called a lime slurry. Other alkaline-earth-metal hydroxides, and with proper precautions, the alkali-metal hydroxides, may be utilized. The alkali-metal hydroxides are vigorous in their reaction and it is difficult to control them from dehydrochlorinating beyond trichlorethylene. This difficulty is usually not encountered with the solutions or suspensions of alkali-earth-metal hydroxides, and for this reason I prefer to use them. Basic compounds such as sodium carbonate or potassium carbonate or mixtures of these compounds with alkali or alkali-earth-metal hydroxides are satisfactory.

Figure 1 on the attached drawing illustrates one embodiment of the apparatus suitable for use in the practice of my invention, and Figure 2 shows a modification of the process illustrated in Figure 1. Figure 1 consists of a packed column arranged for the production of trichlorethylene from acetylene tetrachloride using an aqueous lime slurry for the basic reactant. This apparatus consists of a rectifying column 1 packed with rings 2 as a contact surface. The column is divided into two portions; the upper is that above point 5, and the lower below that point. Acetylene tetrachloride is introduced either at the midpoint 5 or at some point lower; the lime slurry is introduced at point 4; and trichlorethylene is taken off from the top of the column 3. Steam to heat the column is introduced at 7 and spent lime is withdrawn at 6 through a trap, 10. A simple temperature control for regulating the introduction of steam to the column is illustrated at 9.

The operation of this column is as follows: acetylene tetrachloride, either in the liquid or vapor phase, is continuously introduced at 5, and a dilute aqueous lime slurry of about 2½ per cent concentration is continuously introduced at 4. For satisfactory results, I have found that the acetylene tetrachloride may be introduced at substantially the midpoint of the column, or a point in the lower portion of the column. Condensed acetylene tetrachloride is vaporized in the lower portion of the column which is maintained at a temperature above 94° C. but below the boiling point of the spent lime solution, and is brought into intimate contact with the descending lime slurry, being converted by dehydrochlorination into trichlorethylene. The trichlorethylene which is formed passes up the column as a vapor, and is withdrawn at 3 as a constant-boiling mixture of trichlorethylene and water. When the vapor is condensed, a water layer and a trichlorethylene layer form. The trichlorethylene is separated from the water layer and is dried.

The upper portion of the column is maintained in the temperature range 73-94° C., preferably at a temperature slightly over 73° C. At this temperature trichlorethylene is vaporized from acetylene tetrachloride and the recondensed acetylene tetrachloride and water flow down the column for further reaction with the basic solution. In the lower portion of the column 8 any condensed acetylene tetrachloride is vaporized from the descending lime slurry. The temperature in this portion is maintained above 94° C., but below the boiling point of the spent lime slurry. The aqueous solution containing reacted and unreacted lime is continuously withdrawn at 6 substantially free of dissolved acetylene tetrachloride through a trap, 10. Steam is introduced at 7 to heat the lower portion of the column, the amount of steam being controlled by the temperature control, 9.

Another method of proceeding is to premix the saturated chlorinated hydrocarbon with the basic solution and to introduce this mixture into the column for reaction and rectification, the temperature of the column being controlled so as to strip the acetylene tetrachloride from the trichlorethylene in that portion of the column above the point of introduction of the premixed acetylene tetrachloride and lime solution, and to vaporize all of the acetylene tetrachloride between the point of introduction and the point of outlet for spent lime slurry to prevent acetylene tetrachloride from passing out of the bottom of the column. The product and spent solution are removed in the same way as described above, when this alternative procedure is followed.

From this description, the advantages of this process over older methods will be clear. The operation is continuous and results in a high-grade product with an almost quantitative yield. The stripping conditions in the upper portion of the column effectively prevent loss of any acetylene tetrachloride with the product, and the high temperature in the lower portion vaporizes all acetylene tetrachloride from the spent basic solution. The acetylene tetrachloride is brought into intimate contact with the lime and readily reacts. The product is quickly withdrawn from the reaction zone so that further reaction is effectively prevented.

As stated above, all of the saturated chlorinated hydrocarbons which are immiscible with water form constant-boiling mixtures with boiling points lower than the boiling point of the pure compound and below the boiling point of water, and in my process I take advantage of this fact to effect the separation of the unsaturated product from the saturated reactant at a temperature lower than would ordinarily be possible. Likewise, the stripping of the saturated reactant from the spent basic solution, leaving the lower portion of the column, is effected at much lower temperatures also, due to the formation of constant-boiling mixtures with water having depressed boiling points compared to the pure compound. This feature allows lower temperatures to be used in operation of the column, thereby saving in energy consumption; and, because the temperature is lower, better control of the reaction is attained, which reduces the tendency to form undesirable by-products.

Ordinarily, an excess of basic solution over that required to effect the conversion is used and the solution is used in dilute concentration in order to utilize the incoming basic solution as a cooling medium for the upper portion of the column. In some cases it is desirable, in order to effect better control, to preheat the lime slurry to a temperature in the neighborhood of 60° C., but this is optional.

The height and dimensions of the column will depend upon the production desired. This may be designed in accordance with principles well known in the art. Various modifications of rectifying-column design, such as the use of outside condensers for stripping acetylene tetrachloride from trichlorethylene and the return of the condensed acetylene tetrachloride into the reaction column, may be used. One such modification of the process is illustrated in Figure 2, wherein premixed lime slurry and acetylene tetrachloride are fed to the column through the line 4'. In this operation, a mixture of trichlorethylene and acetylene tetrachloride is taken off from the top of the column through line 3 and is fractionated in a separate rectifying column, and the acetylene tetrachloride is withdrawn from the bottom of the column and the product consisting of trichlorethylene in water from the top of this separate rectifying column. The acetylene tetrachloride from this column is then returned to line 4' for further reaction in column 1.

While I have particularly described the production of trichlorethylene from acetylene tetrachloride, it will be apparent that the same process is applicable to the preparation of other unsaturated chlorinated hydrocarbons from saturated chlorinated hydrocarbons. For example, the process may be used for the production of s-dichlorethylene from 1,1,2-trichlorethane; 1,1-dichlorpropene-1 from 1,1,2-trichlorpropane and perchlorethylene from pentachlorethane, and for the preparation of other unsaturated chlorinated hydrocarbons from saturated chlorinated hydrocarbons which are dehydrochlorinatable. In fact, my process may be utilized for the continuous treatment of any saturated chlorinated hydrocarbon that is dehydrochlorinatable to prepare the corresponding unsaturated chlorinated hydrocarbon.

What I claim is:

1. A continuous process for producing an unsaturated chlorinated hydrocarbon which comprises continuously bringing a saturated polychlorinated hydrocarbon that is dehydrochlorinatable into intimate contact with an aqueous solution of a non-volatile base in the mid-portion of a rectifying column to cause partial dehydrochlorination of the saturated polychlorinated hydrocarbon, maintaining the upper portion of the column at a temperature above the boiling point of the unsaturated chlorinated hydrocarbon in water and continuously separating the unsaturated chlorinated hydrocarbon in vapor phase from the saturated polychlorinated hydrocarbon in the upper portion of the column and removing the unsaturated reaction product from the upper portion of the column, maintaining the bottom of the column above the boiling point of the saturated polychlorinated hydrocarbon in water and below the boiling point of the aqueous solution of the base to continuously strip and separate the saturated reactant from the aqueous solution of the base in the lower portion of the column and withdrawing the reacted aqueous solution of the base from the bottom of the column.

2. A continuous process for producing an unsaturated chlorinated hydrocarbon which comprises continuously bringing a saturated polychlorinated hydrocarbon that is dehydrochlorinatable into intimate contact with an aqueous solution of a basic compound of a metal of the group consisting of alkali and alkali-earth metals, between the upper and lower portion of a rectifying column, maintaining the upper portion of the column at a temperature above the boiling point of the unsaturated reaction product in water and below the boiling point of the saturated reactant in water to effect stripping of unsaturated reaction product in vapor phase from the saturated reactant in the upper portion of the column and continuously withdrawing the unsaturated reaction product from the upper portion of the column, maintaining the bottom of the column above the boiling point of the saturated reactant in water and below the boiling point of the aqueous solution of the basic compound to continuously strip and separate the saturated reactant from the aqueous solution of the basic compound in the lower portion of the column and withdrawing the spent aqueous solution of the basic compound from the bottom of the column.

3. A continuous process for producing an unsaturated chlorinated hydrocarbon which comprises continuously bringing a saturated polychlorinated hydrocarbon that is dehydrochlorinatable into intimate contact with an aqueous lime slurry in the mid-portion of a rectifying column, maintaining the upper portion of the column at the boiling point of the unsaturated reaction product in water and below the boiling point of the saturated reactant in water to effect stripping of unsaturated reaction product in vapor phase from the saturated reactant in the upper portion of the column and continuously withdrawing the unsaturated reaction product from the upper portion of the column, maintaining the bottom of the column above the boiling point of the saturated reactant in water and below the boiling point of the aqueous lime solution to continuously strip and separate the saturated reactant from the aqueous lime solution in the lower part of the column and withdrawing the spent aqueous lime solution from the bottom of the column.

4. A continuous process for producing trichlorethylene which comprises continuously bringing acetylene tetrachloride into intimate contact with an aqueous solution of a non-volatile base in the mid-portion of a rectifying column to cause partial dehydrochlorination of the acetylene tetrachloride to form trichlorethylene, maintaining the upper portion of the column at a temperature above the boiling point of trichlorethylene in water and continuously separating trichlorethylene in vapor phase from the acetylene tetrachloride in the upper portion of the column and removing trichlorethylene from the upper portion of the column, maintaining the bottom of the column above the boiling point of acetylene tetrachloride in water and below the boiling point of the aqueous solution of the base to continuously strip and separate the acetylene tetrachloride from the aqueous solution of the base in the lower portion of the column and withdrawing the reacted aqueous solution of the base from the bottom of the column.

5. A continuous process for producing trichlorethylene which comprises continuously reacting acetylene tetrachloride with an aqueous lime solution in a packed column, maintaining the upper portion of the column in the temperature range 73–94° C. to strip acetylene tetrachloride from trichlorethylene and the lower portion of the column in the temperature range above 94° C. but below the boiling point of the aqueous lime solution to strip acetylene tetrachloride from the effluent lime solution, continuously withdrawing trichlorethylene in vapor phase from the upper portion of the column, and withdrawing the reacted aqueous lime solution from the lower portion of the column.

6. The method of producing trichlorethylene from acetylene tetrachloride which comprises continuously feeding acetylene tetrachloride into a column, continuously feeding an aqueous suspension of an alkali-earth-metal hydroxide into the column above the point of feed of the acetylene tetrachloride, heating the column to vaporize the acetylene tetrachloride, maintaining the upper portion of the column in the temperature range of 73–94° C. to separate the trichlorethylene from the acetylene tetrachloride, and maintaining the lower portion of the column in the temperature range of 94–105° C. to separate the acetylene tetrachloride from the alkali-earth-metal hydroxide, continuously withdrawing trichlorethylene in the vapor phase from the upper portion of the column and continuously withdrawing the aqueous suspension of alkali-earth-metal hydroxide from the lower portion of the column.

7. The method of producing trichlorethylene from acetylene tetrachloride in a continuous rectifying column, in the presence of water, which comprises feeding acetylene tetrachloride continuously into the mid-portion of the column and causing vapors of acetylene tetrachloride and water to rise through the column, feeding an aqueous lime solution into the upper portion of the column and causing the aqueous lime solution to flow downward in the column, heating the column to maintain the lower portion in the temperature range above 94° C. but below the boiling point of the aqueous lime solution to strip and separate unreacted acetylene tetrachloride from the lime solution in the lower portion of the column, and maintaining the temperature of the upper portion of the column above the boiling point of trichlorethylene in water and below the boiling point of acetylene tetrachloride in water to separate the trichlorethylene in vapor phase from the acetylene tetrachloride, and continuously withdrawing a vapor mixture of trichlorethylene and water from the top of the column.

8. The method of producing trichlorethylene from acetylene tetrachloride, which comprises continuously feeding acetylene tetrachloride and an aqueous solution of a basic compound of a metal of the group consisting of alkali and alkali-earth metals into the mid-portion of a column, maintaining the base of the column above the boiling point of acetylene tetrachloride mixed with water, separating trichlorethylene from acetylene tetrachloride in the upper portion of the column by maintaining the mixture of trichlorethylene and acetylene tetrachloride at a temperature of substantially 73–94° C. in the upper portion of the column to cause condensation and stripping of the acetylene tetrachloride from the trichlorethylene, returning the condensed acetylene tetrachloride for further reaction with the aqueous solution of the basic compound, continuously removing the separated trichlorethylene and water in a vapor phase from the upper portion of the column, and continuously removing the reacted aqueous solution of the basic compound from the lower portion of the column.

9. A continuous process for producing trichlorethylene which comprises continuously mixing acetylene tetrachloride with an aqueous solution of a non-volatile base and continuously introducing the mixture into a rectifying column, maintaining the upper portion of the column at a temperature above the boiling point of trichlorethylene in water and continuously separating the trichlorethylene in vapor phase from unreacted acetylene tetrachloride in the upper portion of the column and removing trichlorethylene from the upper portion of the column, maintaining the bottom of the column above the boiling point of acetylene tetrachloride in water and below the boiling point of the aqueous solution of the base to continuously and separately strip the unreacted acetylene tetrachloride from the aqueous solution of the base in the lower portion of the column and withdrawing the reacted aqueous solution of the base from the bottom of the column.

10. The process of claim 2 in which the saturated chlorinated hydrocarbon is pentachlorethane and the unsaturated chlorinated hydrocarbon is perchlorethylene.

11. The process of claim 2 in which the saturated chlorinated hydrocarbon is 1,1,2-trichlorethane and the unsaturated chlorinated hydrocarbon is dichlorethylene.

12. A continuous process for producing an unsaturated chlorinated hydrocarbon which comprises continuously bringing a saturated polychlorinated hydrocarbon that is dehydrochlorinatable into intimate contact with an aqueous solution of a basic compound of a metal of the group consisting of alkali and alkali-earth metals in a column, maintaining the upper portion of the column at a temperature above the boiling point of the unsaturated reaction product in water and below the boiling point of the saturated reactant in water to effect stripping of unsaturated reaction product in vapor phase from the saturated reactant in the upper portion of the column and continuously withdrawing the unsaturated reaction product from the upper portion of the column, maintaining the lower portion of the column above the boiling point of the saturated reactant in water and below the boiling point of the aqueous solution of the basic compound to continuously strip the saturated reactant from the aqueous solution of the basic compound in the lower portion of the column, withdrawing the spent aqueous solution of the basic compound from the lower portion of the column, and retaining substantially all unreacted saturated polychlorinated hydrocarbon within the column between said upper and lower portions thereof.

WILLIAM T. NICHOLS.